United States Patent
Bokern et al.

(10) Patent No.: US 12,460,042 B2
(45) Date of Patent: Nov. 4, 2025

(54) CAPROLACTAM-MODIFIED LIQUID MDI AND ITS USE IN POLYURETHANES

(71) Applicant: BASF SE, Ludwigshafen am Rhein (DE)

(72) Inventors: Stefan Bokern, Lemfoerde (DE); Dong Liang, Shanghai (CN); Martin Hufnagel, Lemfoerde (DE); Xiao Yu Sun, Shanghai (CN)

(73) Assignee: BASF SE, Ludwigshafen am Rhein (DE)

( * ) Notice: Subject to any disclaimer, the term of this patent is extended or adjusted under 35 U.S.C. 154(b) by 234 days.

(21) Appl. No.: 18/019,255

(22) PCT Filed: Aug. 6, 2021

(86) PCT No.: PCT/EP2021/072002
§ 371 (c)(1),
(2) Date: Feb. 2, 2023

(87) PCT Pub. No.: WO2022/029289
PCT Pub. Date: Feb. 10, 2022

(65) Prior Publication Data
US 2023/0287166 A1    Sep. 14, 2023

(30) Foreign Application Priority Data

Aug. 7, 2020    (WO) ............... PCT/CN2020/107766

(51) Int. Cl.
*C08G 18/28*    (2006.01)
*C08G 101/00*    (2006.01)

(52) U.S. Cl.
CPC ..... *C08G 18/2855* (2013.01); *C08G 2101/00* (2013.01)

(58) Field of Classification Search
CPC .................................................. C08G 18/2855
See application file for complete search history.

(56) References Cited

U.S. PATENT DOCUMENTS

| | | |
|---|---|---|
| 3,676,405 A | 7/1972 | Labana |
| 5,288,899 A | 2/1994 | Seneker et al. |
| 7,666,971 B2 | 2/2010 | Adkins et al. |
| 2008/0146764 A1 | 6/2008 | Gertzmann et al. |
| 2014/0235756 A1* | 8/2014 | Nakazawa ......... C08G 59/4028 523/400 |
| 2016/0208146 A1* | 7/2016 | Arai ...................... C09J 175/04 |

OTHER PUBLICATIONS

International Search Report and Written Opinion received for PCT Patent Application No. PCT/EP2021/072002, mailed on Oct. 22, 2021, 12 pages.
International Preliminary Report on Patentability received for PCT Patent Application No. PCT/EP2021/072002, mailed on Feb. 16, 2023, 9 pages.

* cited by examiner

*Primary Examiner* — Michael L Leonard
(74) *Attorney, Agent, or Firm* — Faegre Drinker Biddle & Reath LLP

(57) ABSTRACT

The present invention is directed to a liquid, storage stable isocyanate composition (Q) comprising monomeric diphenyl methane diisocyanate (MDI) as component (q1) and an amide with a molecular weight of less than 200 g/mol as component (q2) in an amount of 0.1 to 5 wt.-% based on the sum of the weight of components (q1) and (q2) which adds up to 100 wt.-%, wherein the NCO-content is in the range of from 29.5 to 40.0 wt.-% based on the total weight of the respective isocyanate composition (Q). The present invention is also directed to a process for the manufacture of said liquid, storage stable isocyanate composition (Q) as well as the use of an amide with a molecular weight of less than 200 g/mol for the liquification of at room temperature solid isocyanates. Further, the present invention is directed to the use of an isocyanate composition (Q) of the invention for the synthesis of polyurethane foams, compact polyurethane elastomers or thermoplastic polyurethanes.

21 Claims, No Drawings

CAPROLACTAM-MODIFIED LIQUID MDI AND ITS USE IN POLYURETHANES

CROSS-REFERENCE TO RELATED APPLICATIONS

This application is a National stage application (under 35 U.S.C. § 371) of PCT/EP2021/072002, filed Aug. 6, 2021, which claims benefit of Chinese Application No. PCT/CN2020/107766, filed Aug. 7, 2020, both of which are incorporated herein by reference in their entirety.

The present invention is directed to a liquid, storage stable isocyanate composition (Q) comprising monomeric diphenyl methane diisocyanate (MDI) as component (q1) and an amide with a molecular weight of less than 200 g/mol as component (q2) in an amount of 0.1 to 5 wt.-% based on the sum of the weight of components (q1) and (q2) which adds up to 100 wt.-%, wherein the NCO-content is in the range of from 29.5 to 40.0 wt.-% based on the total weight of the respective isocyanate composition (Q). The present invention is also directed to a process for the manufacture of said liquid, storage stable isocyanate composition (Q) as well as the use of an amide with a molecular weight of less than 200 g/mol for the liquification of at room temperature solid isocyanates. Further, the present invention is directed to the use of an isocyanate composition (Q) of the invention for the synthesis of polyurethane foams, compact polyurethane elastomers or thermoplastic polyurethanes.

Polyisocyanates such as diphenylmethane diisocyanate (MDI) are essential raw materials for the production of plastics such as, for example, polyurethanes. MDI is therefore among the (poly)isocyanates that are produced in highest amounts the world.

In solid form, the most important isomer 4,4'-diphenylmethane diisocyanate (4,4'-MDI), forms insoluble dimers over time, which drastically reduce processability and quality. This is the reason why 4,4'-MDI is usually shipped in molten form at 43° C., which increases logistics and storage cost. Additionally, even with this process, shelf life of 4,4'-MDI is severely limited (2-4 weeks).

Polyisocyanate compositions including a high concentration of diphenyl methane diisocyanate ("MDI"), particularly 4,4'-MDI are useful for various cellular and non-cellular polyurethane applications. However, monomeric 4,4'-MDI has a crystallization temperature of 38° C. and a high concentration of 4,4'-MDI often poses a unique processing problem because 4,4'-MDI is normally a solid material at room temperature, i.e., about 25° C. Therefore, the material has to be melted and maintained at higher temperature in order to be useful as a liquid and used in the cellular and non-cellular polyurethane applications.

Diisocyanates which are liquid at room temperature have obvious advantages compared to those diisocyanates which are solids or slurries at ambient temperature. A liquid is easier to pump and less expensive to transport. A liquid has a homogeneous composition as supplied without the need to homogenize it at elevated temperatures as is the case with slurries or fused solids. In the production of polyurethanes, a liquid can be added easily by weight or volume, and can be combined with suitable co-reactants at ambient temperatures. This is safer than using the materials at elevated temperatures due to the lower vapor pressure of the materials at room temperature.

Numerous patents have issued relating to the liquefication of diphenylmethane diisocyanate, for example U.S. Pat. No. 5,288,899 or U.S. Pat. No. 7,666,971. U.S. Pat. No. 5,288,899 discloses a liquid isocyanate which is prepared by reacting the solid or semi-solid diphenylmethane diisocyanate with ketoximes as blocking agent in quantities such that from 7 to 55% of the isocyanate groups are blocked. U.S. Pat. No. 7,666,971 discloses liquid, storage-stable, amide-modified diphenylmethane diisocyanates and to a process for the production of these liquid, storage-stable diphenylmethane diisocyanates.

As used herein, the term "liquid" is defined as "a solution having a viscosity below 100,000 mPas at 25° C. with no crystals visible to the unaided eye". The term "storage stable" means "a clear liquid after 3 weeks at room temperature with no crystals visible to the unaided eye".

Blocking agents disclosed in the state of the art have the disadvantage that high amounts have to be used to liquefy the composition and the NCO content of the resulting isocyanate compositions often is low. Several blocking agents result in crosslinking which also results in reduced quality of the products.

In view of the state of the art, it was an object of the present invention to provide a liquid storage stable composition comprising diphenyl methane diisocyanate (MDI) with an NCO content suitable for the application of the composition in processes for preparing polyurethanes.

According to the present invention, this object has been solved by liquid, storage stable isocyanate composition (Q) comprising monomeric diphenyl methane diisocyanate (MDI) as component (q1) and an amide with a molecular weight of less than 200 g/mol as component (q2) in an amount of 0.1 to 5 wt.-% based on the total weight of the sum of components (q1) and (q2) which adds up to 100 wt.-%, wherein the NCO-content is in the range of from 29.5 to 40.0 wt.-% based on the total weight of the isocyanate composition (Q).

It has surprisingly been found that diisocyanates which are modified with amides as described herein are low viscosity liquid products which are storage stable at room temperature. It has also been found that these modified diisocyanates can be stored and used in processes without the need to maintain a temperature above room temperature.

The NCO content is determined according to ASTM D-5155-96 A) in the context of the present invention unless otherwise noted.

According to the present invention, isocyanate composition (Q) comprises monomeric diphenyl methane diisocyanate (MDI) as component (q1) and an amide with a molecular weight of less than 200 g/mol as component (q2).

As used herein, the term diphenyl methane diisocyanate refers to 4,4'-diphenylmethane diisocyanate, 2,4'-diphenylmethane diisocyanate, 2,2'-diphenylmethane diisocyanate, and isomer mixtures comprising one or more of 4,4'-diphenylmethane diisocyanate, 2,4'-diphenylmethane diisocyanate, and 2,2'-diphenylmethane diisocyanate. Typically, mixtures with more than 50% of 4,4-MDI are solids or partially solid at room temperature.

Generally, diphenyl methane diisocyanate (MDI) used as component (q1) is an isomer mixture and preferably comprises 4,4'-MDI and one or more isomers selected from the group consisting of 2,4'-MDI and 2,2'-MDI.

According to the present invention, an isomer mixture with a 4,4'-MDI content of at least 70 wt. % based on the weight of the component (q1) may be used, preferably a content in the range of from 70 wt.-% to 100 wt.-%, more preferable in the range of from 90 wt.-% to 99.9 wt.-%, particularly preferable in the range of from 96 wt.-% to 98 wt.-%.

According to the present invention, 2,4'-MDI may for example be present in component (q1) in an amount in the range of from 0 to 15 wt.-% based on the weight of the component (q1), preferably in the range from 1 to 15 wt.-% based on the weight of the component (q1). Preferably, the 2,4'-MDI is present in an amount of from about 1 to 10 wt.-% based on the weight of the component (q1), and more preferably, from about 1 to 5 wt.-% based on the weight of the component (q1).

Suitable diisocyanates to be used as component (q1) may comprise the 2,2'-isomer in an amount in the range of from 0 to 15 wt.-% based on the weight of the component (q1), preferably in an amount in the range of from 0.1 to 6 wt.-% based on the weight of the component (q1), and preferably 0.2 to 2 wt.-% based on the weight of the component (q1). When mixtures of the 2,2'-isomer, the 2,4'-isomer and the 4,4'-isomer of diphenylmethane diisocyanate are used, the sum of the weight of the individual isomers totals 100% by weight of the diphenylmethane diisocyanate.

According to a further aspect, the present invention therefore also relates to the isocyanate composition (Q) as disclosed above, wherein the monomeric MDI is an isomer mixture with a 4,4'-MDI isomer content of at least 70 wt.-% based on the total amount of the isomer mixture, preferably with a 4,4'-MDI isomer content in the range of from 70 wt.-% to 100 wt.-% based on the total amount of the isomer mixture.

According to a further aspect, the present invention therefore also relates to the isocyanate composition (Q) as disclosed above, wherein the monomeric MDI is an isomer mixture with a 4,4'-MDI isomer content of at least 96 wt.-% based on the total amount of the isomer mixture, preferably with a 4,4'-MDI isomer content in the range of from 96 wt.-% to 99.9 wt.-% based on the total amount of the isomer mixture.

The isocyanate composition (Q) further comprises an amide with a molecular weight of less than 200 g/mol as component (q2), for example a molecular weight in the range of from 50 to less than 200 g/mol. In principle aliphatic and aromatic amides can be used as component (q2) in the context of the present invention. According to the present invention, linear or cyclic aliphatic amides are preferably used. The amide may be functionalized in the context of the present invention. Suitable amides with a molecular weight of less than 200 g/mol are known to the person skilled in the art.

Preferably, aliphatic amides are used according to the present invention. It has been found that cyclic amides can be particularly advantageous as component (q2).

According to a further aspect, the present invention therefore also relates to the isocyanate composition (Q) as disclosed above, wherein the amide with a molecular weight of less than 200 g/mol is an aliphatic amide.

According to a further aspect, the present invention therefore also relates to the isocyanate composition (Q) as disclosed above, wherein the amide with a molecular weight of less than 200 g/mol is a lactam. Suitable lactams are for example beta-Caprolactam, gamma-Caprolactam, delta-Caprolactam, epsilon-Caprolactam and Laurolactam.

According to the present invention, also mixtures of one or more amides may be used, in particular mixtures of one or more lactams.

According to a further aspect, the present invention therefore also relates to the isocyanate composition (Q) as disclosed above, wherein the amide with a molecular weight of less than 200 g/mol is selected from the group consisting of beta-Caprolactam, gamma-Caprolactam, delta-Caprolactam, epsilon-Caprolactam and Laurolactam. According to a further aspect, the present invention therefore also relates to the isocyanate composition (Q) as disclosed above, wherein the amide with a molecular weight of less than 200 g/mol is epsilon-Caprolactam.

According to the present invention, component (q2) is used in an amount in the range of from 0.1 to 5 wt.-% based on the total weight of the sum of components (q1) and (q2). According to the present invention, the amount of components (q1) and (q2) adds up to 100 wt.-%. It has been found that the use of the amide with a molecular weight of less than 200 g/mol according to the present invention allows to use only small amounts of the amide to obtained liquid storage stable compositions comprising diphenyl methane diisocyanate (MDI) as component (q1). Preferably, the amide content is in the range of from 1 to 4 wt.-% based on the total weight of the sum of components (q1) and (q2), more preferable in the range of from 1.5 to 3 wt.-% based on the total weight of the sum of components (q1) and (q2).

According to a further aspect, the present invention therefore also relates to the isocyanate composition (Q) as disclosed above, wherein the amide content is in the range of from 1 to 4 wt.-% based on the total weight of the sum of components (q1) and (q2).

According to a further aspect, the present invention therefore also relates to the isocyanate composition (Q) as disclosed above, wherein n the amide content is in the range of from 1.5 to 3 wt.-% based on the total weight of the sum of components (q1) and (q2).

In the context of the present invention it is possible that the composition (Q) comprises further additives. It is also possible that the composition (Q) consists of the components (q1) and (q2).

The liquid, storage stable, amide-modified diisocyanates of the present invention are typically characterized by an NCO group content in the range of from 29.5 to 33 wt.-% based on the total weight of the isocyanate composition (Q), preferably in the range of from 30 to 32 wt.-% based on the total weight of the isocyanate composition (Q).

According to a further aspect, the present invention therefore also relates to the isocyanate composition (Q) as disclosed above, wherein the NCO-content is in the range of from 29.5 to 33 wt.-% based on the total weight of the isocyanate composition (Q), preferably in the range of from 30 to 32 wt.-% based on the total weight of the isocyanate composition (Q).

The isocyanate composition (Q) according to the present invention is liquid and storage stable.

Preferably, the composition has a cloud point in the range of from 7° C. to 35° C., more preferable in the range of from 7 to 20° C. The cloud point is determined according to method 1 as described in the example section below using a rheological method.

According to a further aspect, the present invention therefore also relates to the isocyanate composition (Q) as disclosed above, wherein the cloud point of the liquid isocyanate composition is in the range of from 7° C. to 35° C.

According to a further aspect, the present invention therefore also relates to the isocyanate composition (Q) as disclosed above, wherein the cloud point of the liquid isocyanate composition is in the range of from 7 to 20° C.

The composition (Q) is liquid at room temperature. The viscosity of the composition can vary in broad ranges and is for example in the range of from 4 to 5000 mPas measured at 40° C., preferably in the range of from 5 to 4000 mPas measured at 40° C., more preferable in the range of from 6 to 3000 mPas measured at 40° C., in particular in the range of 6 to 200 mPas measured at 40° C.

Preferably, the viscosity of the composition measured at 25° C. is for example in the range of from 15 to 100000 mPas measured at 25° C., preferably in the range of from 15 to 20000 mPas measured at 25° C., more preferable in the range of from 15 to 5000 mPas measured at 25° C., in particular in the range of 5 to 1000 mPas measured at 25° C., and particularly preferred in the range of from 15 to 100 mPas measured at 25° C.

Unless otherwise noted, the viscosity is determined according to DIN 53 018 in the context of the present invention.

According to a further aspect, the present invention therefore also relates to the isocyanate composition (Q) as disclosed above, wherein the viscosity of the liquid isocyanate composition is in the range of from 4 to 5000 mPas measured at 40° C.

In the context of the present invention it is possible that the composition (Q) comprises further additives. Suitable additives are in principle known to the person skilled in the art. Preferably, the composition comprises further additives which are suitable to liquefy the isocyanate composition. Suitable additives are for example selected from carbodiimide-modified isocyanates, uretdion-modified isocyanates, oligomeric MDI, polymeric MDI, prepolymers. The composition further can comprise one or more solvents and suitable auxiliaries such as for example plasticizers.

According to a further aspect, the present invention therefore also relates to the isocyanate composition (Q) as disclosed above, further comprising one or more additives selected from the group consisting of carbodiimide-modified isocyanates, uretdion-modified isocyanates, oligomeric MDI, polymeric MDI, prepolymers, solvent and plasticizer.

The amount of additives may vary in broad ranges according to the present invention. Further additives might for example be added in an amount in the range of from 0.1 to 40.0 wt.-% based on the total weight of the isocyanate composition (Q). The isocyanate composition (Q) may comprise one or more additives.

According to a further aspect, the present invention therefore also relates to the isocyanate composition (Q) as disclosed above, wherein the amount of additives is in the range of from 0.1 to 40.0 wt.-% based on the total weight of the isocyanate composition (Q).

According to a further aspect, the present invention also relates to a process for the manufacture of a liquid, storage stable isocyanate composition (Q) as disclosed above, comprising reacting the monomeric MDI with the respective amount of the amide at a temperature in the range of from 20 to 100° C., in particular in the range of from 40° C. to 100° C. for at least 1 min. Preferably, the reaction is carried out for a time in the range of from 1 to 120 minutes, more preferable in the range of from 5 to 80 minutes, in particular in the range of from 10 to 45 minutes.

According to the present invention, the monomeric MDI is reacted with the amide with a molecular weight of less than 200 g/mol to obtain a liquid, storage stable isocyanate composition (Q).

According to the present invention, the monomeric MDI with the respective amount of the amide are reacted at a temperature in the range of from 40° C. to 100° C. for at least 1 min. Suitable steps of the process and conditions are in principle known to the person skilled in the art. According to the present invention, the components are usually mixed in a suitable vessel prior to reacting. The reaction is carried out at a temperature in the range of from 20 to 100° C., in particular in the range of from 40° C. to 100° C. for at least 1 minute. The reaction time and further reaction conditions are preferably adapted to allow for a reaction of the monomeric MDI with the respective amount of the amide to provide the liquid, storage stable isocyanate composition of the present invention.

Preferably, the reaction is carried out at a temperature in the range of from 45 to 80° C., more preferable in the range of from 50 to 70° C. The reaction time is usually adapted to the temperature and may for example be in the range of from 1 to 120 minutes, preferably in the range of from 2 to 120 minutes, more preferable in the range of from 5 to 80 minutes.

According to a further aspect, the present invention therefore also relates to the process for the manufacture of a liquid, storage stable isocyanate composition (Q) as disclosed above, wherein the temperature is in the range of from 45 to 80° C.

According to a further aspect, the present invention therefore also relates to the process for the manufacture of a liquid, storage stable isocyanate composition (Q) as disclosed above, wherein the reaction time is in the range of from 5 to 80 min.

Preferably, the amide is used in an amount in the range of from 0.1 to 5 wt.-% based on the sum of the weight of the monomeric MDI used as component (q1) and the amide used as component (q2).

According to a further aspect, the present invention therefore also relates to the process for the manufacture of a liquid, storage stable isocyanate composition (Q) as disclosed above, wherein the amount of the amide with a molecular weight of less than 200 g/mol is in the range of from 0.1 to 5 wt.-% based on the sum of the weight of the solid isocyanate as component (q1) and the amide as component (q2).

Suitable monomeric MDI in the context of the present invention are for example isomer mixtures as described above. Preferably, the monomeric MDI is an isomer mixture, preferably an isomer mixture with a 4,4'-MDI isomer content of at least 70 wt.-% based on the total amount of the isomer mixture, preferably of at least 96 wt.-% based on the total amount of the isomer mixture, for example in the range of from 70 wt.-% to 100 wt.-%, preferably in the range of from 96 wt.-% to 99.9 wt.-%, in particular in the range of from 98 wt.-% to 99 wt.-%, in each case based on the total amount of the isomer mixture.

According to a further aspect, the present invention therefore also relates to the process for the manufacture of a liquid, storage stable isocyanate composition (Q) as disclosed above, wherein the monomeric MDI is an isomer mixture with a 4,4'-MDI isomer content of at least 70 wt.-% based on the total amount of the isomer mixture, preferably with a 4,4'-MDI isomer content in the range of from 70 wt.-% to 100 wt.-% based on the total amount of the isomer mixture, more preferably of at least 96 wt.-% based on the total amount of the isomer mixture, in particular with a 4,4'-MDI isomer content in the range of from 96 wt.-% to 99.9 wt.-% based on the total amount of the isomer mixture.

Suitable amides are those described above, in particular aliphatic amides, preferably cyclic amides such as lactams. According to a further aspect, the present invention therefore also relates to the process for the manufacture of a liquid, storage stable isocyanate composition (Q) as disclosed above, wherein the amide with a molecular weight of less than 200 g/mol is an aliphatic amide, preferably a lactam.

According to a further aspect, the present invention also relates to the process for the manufacture of a liquid, storage stable isocyanate composition (Q) as disclosed above, wherein the amide with a molecular weight of less than 200 g/mol is selected from the group consisting of beta-Caprolactam, gamma-Caprolactam, delta-Caprolactam, epsilon-Caprolactam and Laurolactam. Preferably, the amide with a molecular weight of less than 200 g/mol is epsilon-Caprolactam in the context of the present invention.

The liquid, storage stable isocyanate composition (Q) obtained in the process preferably has an NCO-content in the range of from 29.5 to 40.0 wt.-% as described above.

According to a further aspect, the present invention therefore also relates to the process for the manufacture of a liquid, storage stable isocyanate composition (Q) as disclosed above, wherein the NCO-content of the liquid isocyanate composition (Q) is in the range of from 29.5 to 40.0 wt.-%, preferably in the range of from 29.5 to 33 wt.-% based on the total weight of the isocyanate composition (Q).

The liquid, storage stable isocyanate composition (Q) obtained in the process according to the present invention usually has a viscosity in the range of from 4 to 5000 mPas measured at 40° C., preferably in the range of from 5 to 4000 mPas measured at 40° C. Usually, the cloud point of the liquid isocyanate composition (Q) is in the range of from 7° C. to 35° C.

According to a further aspect, the present invention therefore also relates to the process for the manufacture of a liquid, storage stable isocyanate composition (Q) as disclosed above, wherein the cloud point of the liquid isocyanate composition (Q) is in the range of from 7° C. to 35° C., preferably in the range of from 7° C. to 20° C.

According to a further aspect, the present invention therefore also relates to the process for the manufacture of a liquid, storage stable isocyanate composition (Q) as disclosed above, wherein the viscosity of the liquid isocyanate composition (Q) is in the range of from 4 to 5000 mPas measured at 40° C.

According to a further aspect, the present invention also relates to the use of an amide with a molecular weight of less than 200 g/mol for the liquification of at room temperature solid isocyanates, preferably of monomeric diphenyl methane diisocyanate (MDI). The present invention is also directed to the use of an amide with a molecular weight of less than 200 g/mol for the liquification of monomeric diphenyl methane diisocyanate (MDI), wherein the amide is used in an amount in the range of from 0.1 to 5 wt.-% based on the sum of the weight of the solid isocyanate as component (q1) and the amide as component (q2). In principle, isomer mixtures can be used according to the present invention as described above.

According to a further aspect, the present invention also relates to use of an amide with a molecular weight of less than 200 g/mol for the liquification of at room temperature solid isocyanates, preferably of monomeric diphenyl methane diisocyanate (MDI) as disclosed above, wherein the solid isocyanate is monomeric 4,4'-MDI with a 4,4'-MDI isomer content of at least 70 wt.-% based on the total amount of the isomer mixture, preferably with a 4,4'-MDI isomer content in the range of from 70 wt.-% to 100 wt.-% based on the total amount of the isomer mixture, more preferably with a 4,4'-MDI isomer content of at least 96 wt.-% based on the total amount of the isomer mixture, in particular with a 4,4'-MDI isomer content in the range of from 96 wt.-% to 99.9 wt.-% based on the total amount of the isomer mixture, and the amount of the amide is in the range of from 0.1 to 5 wt.-% based on the total weight of the sum of components (q1) and (q2).

With respect to preferred embodiments, reference is made to the disclosure above. Preferably, in the context of the present invention, the amide is an aliphatic amide, more preferable an aliphatic cyclic amide. According to a further aspect, the present invention therefore also relates to use of an amide with a molecular weight of less than 200 g/mol for the liquification of at room temperature solid isocyanates, preferably of monomeric diphenyl methane diisocyanate (MDI) as disclosed above, wherein the amide with a molecular weight of less than 200 g/mol is an aliphatic amide.

According to a further aspect, the present invention also relates to use of an amide with a molecular weight of less than 200 g/mol for the liquification of at room temperature solid isocyanates, preferably of monomeric diphenyl methane diisocyanate (MDI) as disclosed above, wherein the amide with a molecular weight of less than 200 g/mol is a lactam.

According to a further aspect, the present invention also relates to use of an amide with a molecular weight of less than 200 g/mol for the liquification of at room temperature solid isocyanates, preferably of monomeric diphenyl methane diisocyanate (MDI) as disclosed above, wherein the amide with a molecular weight of less than 200 g/mol is selected from the group consisting of beta-Caprolactam, gamma-Caprolactam, delta-Caprolactam, epsilon-Caprolactam and Laurolactam.

According to a further aspect, the present invention therefore also relates to use of an amide as disclosed above, wherein the amide with a molecular weight of less than 200 g/mol is epsilon-Caprolactam.

According to a further aspect, the present invention also relates to use of an amide as disclosed above, wherein the amount of amide is in the range of from 1 to 4 wt.-% based on the total weight of the sum of components (q1) and (q2), preferably in the range of from 1.5 to 3 wt.-% based on the total weight of the sum of components (q1) and (q2).

The liquid, storage-stable isocyanates can be used for the preparation of polyurethanes or polyureas and, in particular, polyurethane or polyurea coatings, adhesives, sealants, patching compounds, and elastomers. These polyurethanes are prepared by the reaction of the isocyanates with glycols and/or polyols, and chain extenders and/or crosslinkers. Polyureas are prepared by the reaction of the isocyanates with diamines and/or polyamines, and chain extenders and/or crosslinkers. Suitable reaction conditions and reactants are known to the person skilled in the art.

The polyurethanes may be used for any application, for example for dampening applications, sealants, adhesives, coatings and for footwear applications.

According to a further aspect, the present invention also relates to the use of an isocyanate composition (Q) according to the present invention for the synthesis of polyurethane foams, compact polyurethane elastomers or thermoplastic polyurethanes.

According to a further aspect, the present invention also relates to the use of an isocyanate composition (Q) according to the present invention for the synthesis of polyurethane foams as disclosed above, wherein the polyurethane foams are foams for dampening applications, sealants, adhesives, coatings and for footwear applications.

The polyurethanes might for example also be used for producing cables, films, industrial elements, accessories and/or auxiliary elements in the automobile sector, accessories and/or auxiliary elements in the sector of transport, accessories in the sports or leisure sector, more particularly for producing cables, spiral and pneumatic hoses, films, ski boot shells, animal identification tags, screening elements, rail pads, seals, bushes, V-belts, bellows, stop buffers, roller covers or ski-tips.

The present invention also relates to the use of a liquid, storage stable isocyanate composition (Q) comprising monomeric diphenyl methane diisocyanate (MDI) as component (q1) and an amide with a molecular weight of less than 200 g/mol as component (q2) in an amount of 0.1 to 5 wt.-%, preferably in the range of from 1 to 4 wt.-%, more preferable in the range of from 1.5 to 3 wt.-%, based on the total weight of the respective isocyanate composition (Q), wherein the NCO-content is in the range of from 29.5 to 40.0 wt.-%, preferably in the range of from 29.5 to 33 wt.-%, for the synthesis of polyurethane foams, compact polyurethane elastomers or thermoplastic polyurethane, wherein the monomeric MDI is an isomer mixture with a 4,4'-MDI isomer content of at least 96 wt.-%, preferably with a 4,4'-MDI isomer content in the range of from 96 wt.-% to 99.9 wt.-% based on the total amount of the isomer mixture, and the amide with a molecular weight of less than 200 g/mol is epsilon-Caprolactam.

According to a further aspect, the present invention also is directed to the use of an isocyanate composition (Q) as disclosed above for stabilizing a composition containing at least one polyurethane prepolymer. It was found that the composition (Q) can be used to improve the shelf time of prepolymer compositions. The amount of the composition (Q) used for stabilizing a prepolymer composition may vary in broad ranges.

The present invention is further illustrated by the following set of embodiments and combinations of embodiments resulting from the dependencies and back-references as indicated. In particular, it is noted that in each instance where a range of embodiments is mentioned, for example in the context of a term such as "any one of embodiments (1) to (4)", every embodiment in this range is meant to be explicitly disclosed for the skilled person, i.e. the wording of this term is to be understood by the skilled person as being synonymous to "any one of embodiments (1), (2), (3), and (4)".

Further, it is explicitly noted that the following set of embodiments is not the set of claims determining the extent of protection, but represents a suitably structured part of the description directed to general and preferred aspects of the present invention.

According to an embodiment (1), the present invention relates to a liquid, storage stable isocyanate composition (Q) comprising monomeric diphenyl methane diisocyanate (MDI) as component (q1) and an amide with a molecular weight of less than 200 g/mol as component (q2) in an amount of 0.1 to 5 wt.-% based on the sum of the weight of components (q1) and (q2) which adds up to 100 wt.-%, wherein the NCO-content is in the range of from 29.5 to 40.0 wt.-% based on the total weight of the respective isocyanate composition (Q).

A further embodiment (2) concretizing embodiment (1) relates to said isocyanate composition (Q) according to embodiment (1), wherein the monomeric MDI is an isomer mixture with a 4,4'-M DI isomer content of at least 70 wt.-% based on the total amount of the isomer mixture, preferably with a 4,4'-MDI isomer content in the range of from 70 wt.-% to 100 wt.-% based on the total amount of the isomer mixture.

A further embodiment (3) concretizing embodiment (1) or (2) relates to said isocyanate composition (Q) according to embodiment (1) or (2), wherein the monomeric MDI is an isomer mixture with a 4,4'-MDI isomer content of at least 96 wt.-%. based on the total amount of the isomer mixture, preferably with a 4,4'-MDI isomer content in the range of from 96 wt.-% to 99.9 wt.-% based on the total amount of the isomer mixture.

A further embodiment (4) concretizing embodiments (1) to (3) relates to said isocyanate composition (Q) according to any one of the embodiments (1) to (3), wherein the amide with a molecular weight of less than 200 g/mol is an aliphatic amide.

A further embodiment (5) concretizing embodiments (1) to (4) relates to said isocyanate composition (Q) according to any one of the embodiments (1) to (4), wherein the amide with a molecular weight of less than 200 g/mol is a lactam.

A further embodiment (6) concretizing embodiments (1) to (5) relates to said isocyanate composition (Q) according to any one of the embodiments (1) to (5), wherein the amide with a molecular weight of less than 200 g/mol is selected from the group consisting of beta-Caprolactam, gamma-Caprolactam, delta-Caprolactam, epsilon-Caprolactam and Laurolactam.

A further embodiment (7) concretizing embodiments (1) to (6) relates to said isocyanate composition (Q) according to any one of the embodiments (1) to (6), wherein the amide with a molecular weight of less than 200 g/mol is epsilon-Caprolactam.

A further embodiment (8) concretizing embodiments (1) to (7) relates to said isocyanate composition (Q) according to any one of the embodiments (1) to (7), wherein the amide content is in the range of from 1 to 4 wt.-% based on the total weight of the sum of components (q1) and (q2).

A further embodiment (9) concretizing embodiments (1) to (8) relates to said isocyanate composition (Q) according to anyone of the embodiments (1) to (8), wherein the amide content is in the range of from 1.5 to 3 wt.-% based on the total weight of the sum of components (q1) and (q2).

A further embodiment (10) concretizing embodiments (1) to (9) relates to said isocyanate composition (Q) according to any one of the embodiments (1) to (9), wherein the NCO-content is in the range of from 29.5 to 33 wt.-% based on the total weight of the isocyanate composition (Q), preferably in the range of from 30 to 32 wt.-% based on the total weight of the isocyanate composition (Q).

A further embodiment (11) concretizing embodiments (1) to (10) relates to said isocyanate composition (Q) according to any one of the embodiments (1) to (10), wherein the cloud point of the liquid isocyanate composition is in the range of from 7° C. to 35° C.

A further embodiment (12) concretizing embodiments (1) to (11) relates to said isocyanate composition (Q) according to any one of the embodiments (1) to (11), wherein the cloud point of the liquid isocyanate composition is in the range of from 7 to 20° C.

A further embodiment (13) concretizing embodiments (1) to (12) relates to said isocyanate composition (Q) according to any one of the embodiments (1) to (12), wherein the viscosity of the liquid isocyanate composition is in the range of from 4 to 5000 mPas measured at 40° C.

A further embodiment (14) concretizing embodiments (1) to (12) relates to said isocyanate composition (Q) according to any one of the embodiments (1) to (12), wherein the viscosity of the liquid isocyanate composition is in the range of from 5 to 100000 mPas measured at 25° C.

A further embodiment (15) concretizing embodiments (1) to (14) relates to said isocyanate composition (Q) according to any one of the embodiments (1) to (14), wherein the viscosity of the liquid isocyanate composition is in the range of from 4 to 5000 mPas measured at 40° C. and in the range of from 5 to 100000 mPas measured at 25° C.

A further embodiment (16) concretizing embodiments (1) to (15) relates to said isocyanate composition (Q) according to any one of the embodiments (1) to (15), wherein the isocyanate composition (Q) further comprises one or more additives selected from the group consisting of carbodiimide-modified isocyanates, uretdion-modified isocyanates, oligomeric MDI, polymeric MDI, prepolymers, solvent and plasticizer.

A further embodiment (17) concretizing embodiments (1) to (16) relates to said isocyanate composition (Q) according to embodiment (16), wherein the amount of additives is in the range of from 0.1 to 40.0 wt.-% based on the total weight of the isocyanate composition (Q).

An embodiment (18) of the present invention relates to a process for the manufacture of a liquid, storage stable isocyanate composition (Q), preferably according to any one of the embodiments (1) to (16), said process comprising reacting the monomeric MDI with the respective amount of the amide at a temperature in the range of from 20 to 100° C., in particular in the range of from 40° C. to 100° C. for at least 1 min.

A further embodiment (19) concretizing embodiment (18) relates to said process according to embodiment (18), wherein the amount of the amide with a molecular weight of less than 200 g/mol is in the range of from 0.1 to 5 wt.-% based on the total weight of the respective isocyanate composition (Q).

A further embodiment (20) concretizing embodiment (18) or (19) relates to said process according to embodiment (18) or (19), wherein the monomeric MDI is an isomer mixture with a 4,4'-MDI isomer content of at least 70 wt.-%, preferably with a 4,4'-MDI isomer content in the range of from 70 wt.-% to 100 wt.-% based on the total amount of the isomer mixture, more preferably of at least 96 wt.-% based on the total amount of the isomer mixture, in particular with a 4,4'-MDI isomer content in the range of from 96 wt.-% to 99.9 wt.-% based on the total amount of the isomer mixture.

A further embodiment (21) concretizing embodiments (18) to (1820 relates to said process according to any one of the embodiments (18) to (20), wherein the amide with a molecular weight of less than 200 g/mol is an aliphatic amide.

A further embodiment (22) concretizing embodiments (18) to (21) relates to said process according to any one of the embodiments (16) to (19), wherein the amide with a molecular weight of less than 200 g/mol is a lactam.

A further embodiment (23) concretizing embodiments (18) to (21) relates to said process according to any one of the embodiments (18) to (22), wherein the amide with a molecular weight of less than 200 g/mol is selected from the group consisting of beta-Caprolactam, gamma-Caprolactam, delta-Caprolactam, epsilon-Caprolactam and Laurolactam.

A further embodiment (24) concretizing embodiments (18) to (23) relates to said process according to any one of the embodiments (18) to (23), wherein the amide with a molecular weight of less than 200 g/mol is epsilon-Caprolactam.

A further embodiment (25) concretizing embodiments (18) to (24) relates to said process according to any one of the embodiments (18) to (24), wherein the NCO-content of the liquid isocyanate composition (Q) is in the range of from 29.5 to 40.0 wt.-%, preferably in the range of from 29.5 to 33 wt.-% based on the total weight of the isocyanate composition (Q).

A further embodiment (26) concretizing embodiments (18) to (25) relates to said process according to any one of the embodiments (18) to (25), wherein the cloud point of the liquid isocyanate composition (Q) is in the range of from 7° C. to 35° C., preferably in the range of from 7° C. to 20° C.

A further embodiment (27) concretizing embodiments (18) to (26) relates to said process according to any one of the embodiments (18) to (26), wherein the viscosity of the liquid isocyanate composition (Q) is in the range of from 4 to 5000 mPas measured at 40° C.

A further embodiment (28) concretizing embodiments (18) to (26) relates to said isocyanate composition (Q) according to any one of the embodiments (1) to (12), wherein the viscosity of the liquid isocyanate composition is in the range of from 5 to 100000 mPas measured at 25° C.

A further embodiment (29) concretizing embodiments (18) to (28) relates to said isocyanate composition (Q) according to any one of the embodiments (18) to (28), wherein the viscosity of the liquid isocyanate composition is in the range of from 4 to 5000 mPas measured at 40° C. and in the range of from 5 to 100000 mPas measured at 25° C.

A further embodiment (30) concretizing embodiments (18) to (29) relates to said process according to any one of embodiments (18) to (29), wherein the temperature is in the range of from to 80° C.

A further embodiment (31) concretizing embodiments (18) to (30) relates to said process according to any one of embodiments (18) to (30), wherein the reaction time is in the range of from 5 to 80 min.

An embodiment (32) of the present invention relates to the use of an amide with a molecular weight of less than 200 g/mol for the liquification of at room temperature solid isocyanates, preferably of monomeric diphenyl methane diisocyanate (MDI).

A further embodiment (33) concretizing embodiment (32) relates to said use of an amide according to embodiment (28), wherein the solid isocyanate is monomeric 4,4'-MDI with a 4,4'-MDI isomer content of at least 70 wt.-% based on the total amount of the isomer mixture, preferably with a 4,4'-MDI isomer content in the range of from 70 wt.-% to 100 wt.-% based on the total amount of the isomer mixture, more preferably with a 4,4'-MDI isomer content of at least 96 wt.-% based on the total amount of the isomer mixture, in particular with a 4,4'-MDI isomer content in the range of from 96 wt.-% to 99.9 wt.-% based on the total amount of the isomer mixture and the amount of the amide is in the range of from 0.1 to 5 wt.-% based on the sum of the weight of the solid isocyanate as component (q1) and the amide as component (q2).

A further embodiment (34) concretizing embodiments (32) to (33) relates to said use according to embodiment (32) or (33), wherein the amide with a molecular weight of less than 200 g/mol is an aliphatic amide.

A further embodiment (35) concretizing embodiments (32) to (34) relates to said use according to any one of the embodiments (32) to (34), wherein the amide with a molecular weight of less than 200 g/mol is a lactam.

A further embodiment (36) concretizing embodiments (32) to (35) relates to said use according to any one of the embodiments (32) to (35), wherein the amide with a molecular weight of less than 200 g/mol is selected from the group consisting of beta-Caprolactam, gamma-Caprolactam, delta-Caprolactam, epsilon-Caprolactam and Laurolactam.

A further embodiment (37) concretizing embodiments (32) to (36) relates to said use according to any one of the embodiments (32) to (36), wherein the amide with a molecular weight of less than 200 g/mol is epsilon-Caprolactam.

A further embodiment (38) concretizing embodiments (32) to (37) relates to said use according to any one of the embodiments (32) to (37), wherein the amount of amide is in the range of from 1 to 4 wt.-% based on the total weight of the sum of components (q1) and (q2), preferably in the range of from 1.5 to 3 wt.-% based on the total weight of the sum of components (q1) and (q2).

An embodiment (39) of the present invention relates to the use of an isocyanate composition (Q) according to any one of the embodiments (1) to (15) for the synthesis of polyurethane foams, compact polyurethane elastomers or thermoplastic polyurethanes.

A further embodiment (40) concretizing embodiment (39) relates to said use according to embodiment (39), wherein the polyurethane foams are foams for dampening applications, sealants, adhesives, coatings and for footwear applications.

An embodiment (41) of the present invention relates to the use of a liquid, storage stable isocyanate composition (Q) comprising monomeric diphenyl methane diisocyanate (MDI) as component (q1) and an amide with a molecular weight of less than 200 g/mol as component (q2) in an amount of 0.1 to 5 wt.-% preferably in the range of from 1 to 4 wt.-%, more preferable in the range of from 1.5 to 3 wt.-%, based on the total weight of the sum of components (q1) and (q2), wherein the NCO-content is in the range of from 29.5 to 40.0 wt.-%, preferably in the range of from 29.5 to 33 wt.-% based on the total weight of the isocyanate composition (Q), preferably of a liquid, storage stable isocyanate composition (Q) according to any one of embodiments (1) to (15), for the synthesis of polyurethane foams, compact polyurethane elastomers or thermoplastic polyurethane, wherein the monomeric MDI is an isomer mixture with a 4,4'-MDI isomer content of at least 96 wt.-% based on the total amount of the isomer mixture, preferably with a 4,4'-MDI isomer content in the range of from 96 wt.-% to 99.9 wt.-% based on the total amount of the isomer mixture and the amide with a molecular weight of less than 200 g/mol is epsilon-Caprolactam.

An embodiment (42) of the present invention relates to a process for preparing polyurethane foams, compact polyurethane elastomers or thermoplastic polyurethanes comprising reacting the isocyanate composition (Q) according to any one of the embodiments (1) to (17) with a polyol composition.

A further embodiment (43) concretizing embodiment (38) relates to said process according to embodiment (42), wherein the polyurethane foams are foams for dampening applications, sealants, adhesives, coatings and for footwear applications.

An embodiment (44) of the present invention relates to the use of an isocyanate composition (Q) according to any one of the embodiments (1) to (17) for stabilizing a composition containing at least one polyurethane prepolymer.

An embodiment (45) of the present invention relates to the use of a liquid, storage stable isocyanate composition (Q) comprising monomeric diphenyl methane diisocyanate (MDI) as component (q1) and an amide with a molecular weight of less than 200 g/mol as component (q2) in an amount of 0.1 to 5 wt.-% preferably in the range of from 1 to 4 wt.-%, more preferable in the range of from 1.5 to 3 wt.-%, based on the total weight of the sum of components (q1) and (q2), wherein the NCO-content is in the range of from 29.5 to 40.0 wt.-%, preferably in the range of from 29.5 to 33 wt.-% based on the total weight of the isocyanate composition (Q), preferably of a liquid, storage stable isocyanate composition (Q) according to any one of embodiments (1) to (15), for stabilizing a composition containing at least one polyurethane prepolymer, wherein the monomeric MDI is an isomer mixture with a 4,4'-MDI isomer content of at least 96 wt.-% based on the total amount of the isomer mixture, preferably with a 4,4'-MDI isomer content in the range of from 96 wt.-% to 99.9 wt.-% based on the total amount of the isomer mixture and the amide with a molecular weight of less than 200 g/mol is epsilon-Caprolactam.

An embodiment (46) of the present invention relates to a process for stabilizing a composition comprising at least one polyurethane prepolymer comprising reacting the addition of the isocyanate composition (Q) according to any one of the embodiments (1) to (17) to a composition comprising at least one polyurethane prepolymer.

The present invention is further illustrated by the following reference examples, comparative examples, and examples.

EXAMPLES

1. Methods Used 1.1 Determination of the Cloud Point (Method 1)

The cloud point was determined using a rheological method using a rheometer of company Anton Paar GmbH, type MCR302 with parallel plates with a diameter of 25 mm and a gap between the plates of 2 mm.

The sample and the apparatus were heated to 50° C. After shearing for 120 s and at a frequency of rotation of 50 Hz, the temperature was lowered by 1° C./min to a temperature of −10° C.

The dynamic viscosity of the mixture increased with the formation of crystals of 4,4'-MDI. The cloud point measured is defined as the turning point of the curve of the dynamic viscosity.

The results obtained are in accordance with the results of optical methods for the determination of the cloud point, for example those described for fuels in ASTM D2500. A comparison of the results shows that the results of the rheological method are more accurate and have a higher reproducibility.

1.2 Determination of the Viscosity

The dynamic viscosity was determined according to DIN 53 018 using a frequency of rotation of 50 Hz after keeping the temperature of the sample at the respective temperature of the measurement for a time of 120 seconds.

2. Preparation of the Isocyanate Compositions

2.1 Examples Using Epsilon-Caprolactam (According to the Invention)

500 g of 4,4'-diphenyl methane diisocyanate (MDI) (Lupranat ME) were added to a vessel and heated to a temperature in the range of about 60 to 80° C. Epsilon-Caprolactam was added in an amount as specified in table 1. The mixture was stirred for 60 minutes. A liquid composition was obtained.

The results of the examples are summarized in table 1.

TABLE 1

| Example No. | Caprolactam % in ME [wt.-%] | % NCO | Cloudpoint [° C.] | Viscosity at 25° C. [mPas] | Viscosity at 40° C. [mPas] |
|---|---|---|---|---|---|
| 1.1 | 0 | 33.5 | 39.1 | Solid | 6 |
| 1.2 | 0.1 | 33.43 | 36.2 | Solid | 6 |
| 1.3 | 0.2 | 33.36 | 34.2 | Solid | 6 |
| 1.4 | 0.5 | 33.15 | 30.2 | Solid | 6 |

TABLE 1-continued

| Example No. | Caprolactam % in ME [wt.-%] | % NCO | Cloudpoint [° C.] | Viscosity at 25° C. [mPas] | Viscosity at 40° C. [mPas] |
|---|---|---|---|---|---|
| 1.5 | 1 | 32.79 | 27.1 | Solid | 6 |
| 1.6 | 1.5 | 32.44 | 19.1 | n.d. | 7 |
| 1.7 | 1.8 | 32.22 | 17.9 | n.d. | 7 |
| 1.8 | 2 | 32.08 | 17.7 | 18 | 8 |
| 1.9 | 2.2 | 31.94 | 17.7 | 18 | 8 |
| 1.10 | 2.4 | 31.8 | 17 | 18 | 8 |
| 1.11 | 2.6 | 31.66 | 15.1 | 19 | 8 |
| 1.12 | 2.8 | 31.52 | 14.8 | 19 | 8 |
| 1.13 | 3 | 31.37 | 14.7 | 19 | 8 |
| 1.14 | 3.2 | 31.23 | 13.7 | n.d. | 8 |
| 1.15 | 3.4 | 31.09 | 13.3 | n.d. | 8 |
| 1.16 | 5 | 29.96 | 7.1 | n.d. | 9 |

2.2 Examples Using Methylethylketoxim (Comparative Examples)

500 g of 4,4'-diphenyl methane diisocyanate (MDI) (Lupranat ME) were added to a vessel and heated to a temperature in the range of about 60 to 80° C. Methylethylketoxim (MEKO) was added in an amount as specified in table 2. The mixture was stirred for 60 minutes. A liquid composition was obtained.

The results of the examples are summarized in table 2.

TABLE 2

| Example No | MEKO % in ME [wt.-%] | % NCO | Cloudpoint [° C.] | Viscosity at 25° C. [mPas] | Viscosity at 40° C. [mPas] |
|---|---|---|---|---|---|
| 2.1 | 0 | 33.5 | 39.1 | Solid | 6.3 |
| 2.2 | 1 | 32.68 | 33.4 | Solid | 6.1 |
| 2.3 | 2 | 31.87 | 30.4 | Solid | 6.8 |
| 2.4 | 3 | 31.05 | 28.3 | Solid | 7.5 |
| 2.5 | 4 | 30.23 | 23.4 | n.d. | 8.3 |
| 2.6 | 5 | 29.41 | 13.9 | 23 | 9.4 |
| 2.7 | 6 | 28.6 | 10.5 | 25 | 10.5 |
| 2.8 | 7 | 27.78 | 5.9 | 27 | 12 |
| 2.9 | 8 | 26.96 | 2.9 | 30 | 13.4 |

2.3. Examples of Using Other Amides 500 g of 4,4'-diphenyl methane diisocyanate (MDI) (Lupranat ME) were added to a vessel and heated to a temperature in the range of about 60 to 80° C. The amide described in table 2 was added in an amount as specified in table 3. The mixture was stirred for 60 minutes. A liquid composition was obtained.

The sample was stored for 24 hours at 20° C. and checked visually for crystallization The results of the examples are summarized in table 3.

TABLE 3

| Example No. | Amide | Amount [wt.-%] | Appearance after 24 hours at 20° C. |
|---|---|---|---|
| 3.1 | Gamma-Butyrolactam | 2.5 | Liquid, some crystal formation |
| 3.2 | Gamma-Butyrolactam | 5 | Liquid, some crystal formation |
| 3.3 | Gamma-Butyrolactam | 10 | Solid |
| 3.4 | Epsilon-Caprolactam | 2.5 | Liquid, clear |
| 3.5 | Epsilon-Caprolactam | 5 | Liquid, clear |
| 3.6 | Epsilon-Caprolactam | 10 | Liquid, clear |
| 3.7 | Laurolactam | 2.5 | Liquid, some crystal formation |
| 3.8 | Laurolactam | 5 | Liquid, some crystal formation |
| 3.9 | Laurolactam | 10 | Liquid, some crystal formation |
| 3.10 | Acetanilide | 2.5 | Solid |
| 3.11 | Acetanilide | 5 | Liquid, some crystal formation |
| 3.12 | Acetanilide | 10 | Liquid, clear |
| 3.13 | Methylacetamide | 2.5 | Liquid, some crystal formation |
| 3.14 | Methylacetamide | 5 | Liquid, clear |
| 3.15 | Methylacetamide | 10 | Liquid, clear |
| 3.16 | N-Ethylacetamide | 2.5 | Solid |
| 3.17 | N-Ethylacetamide | 5 | Solid |
| 3.18 | N-Ethylacetamide | 10 | Liquid, clear |

CITED LITERATURE

U.S. Pat. No. 5,288,899
U.S. Pat. No. 7,666,971

The invention claimed is:

1. A liquid, storage stable isocyanate composition (Q) comprising monomeric diphenyl methane diisocyanate (MDI) as component (q1) and an amide with a molecular weight of less than 200 g/mol as component (q2) in an amount of 0.1 to 5 wt.-% based on the sum of the weight of components (q1) and (q2) which adds up to 100 wt.-%, wherein an NCO content is in the range of from 29.5 to 40.0 wt.-% based on the total weight of the respective isocyanate composition (Q), wherein the amide with a molecular weight of less than 200 g/mol is selected from the group consisting of beta-Caprolactam, gamma-Caprolactam, delta-Caprolactam, epsilon-Caprolactam and Laurolactam.

2. The isocyanate composition (Q) according to claim 1, wherein the monomeric MDI is an isomer mixture with a 4,4'-MDI isomer content of at least 70 wt.-% based on the total amount of the isomer mixture.

3. The isocyanate composition (Q) according to claim 1, wherein the monomeric MDI is an isomer mixture with a 4,4'-MDI isomer content of at least 96 wt.-% based on the total amount of the isomer mixture.

4. The isocyanate composition (Q) according to claim 1, wherein the amide with a molecular weight of less than 200 g/mol is epsilon-Caprolactam.

5. The isocyanate composition (Q) according to claim 1, wherein the amide content is in the range of from 1 to 4 wt.-% based on the total weight of the sum of components (q1) and (q2).

6. The isocyanate composition (Q) according to claim 1, wherein the amide content is in the range of from 1.5 to 3 wt.-% based on the total weight of the sum of components (q1) and (q2).

7. The isocyanate composition (Q) according to claim 1, wherein the NCO-content is in the range of from 29.5 to 33 wt.-% based on the total weight of the isocyanate composition (Q).

8. The isocyanate composition (Q) according to claim 1, wherein the cloud point of the liquid isocyanate composition is in the range of from 7 to 35° C.

9. The isocyanate composition (Q) according to claim 1, wherein the cloud point of the liquid isocyanate composition is in the range of from 7 to 20° C.

10. The isocyanate composition (Q) according to claim 1, wherein the viscosity of the liquid isocyanate composition is in the range of from 4 to 5000 mPas measured at 40° C.

11. The isocyanate composition (Q) according to claim 1, wherein the isocyanate composition (Q) further comprises one or more additives selected from the group consisting of carbodiimide-modified isocyanates, uretdion-modified isocyanates, oligomeric MDI, polymeric MDI, prepolymers, solvent and plasticizer.

12. The isocyanate composition (Q) according to claim 11, wherein the amount of additives is in the range of from 0.1 to 40.0 wt.-% based on the total weight of the isocyanate composition (Q).

13. A process for the manufacture of a liquid, storage stable isocyanate composition (Q) according to claim 1, comprising reacting the monomeric MDI with the respective amount of the amide at a temperature in the range of from 20° C. to 100° C. for at least 1 min.

14. The process according to claim 13, wherein the temperature is in the range of from 45 to 80° C.

15. The process according to claim 13, wherein the reaction time is in the range of from 5 to 80 min.

16. A method comprising utilizing an amide with a molecular weight of less than 200 g/mol for the liquification of at room temperature solid isocyanates, optionally comprising monomeric diphenyl methane diisocyanate (MDI).

17. The method according to claim 16, wherein the solid isocyanate is monomeric 4,4'-MDI with a 4,4'-MDI isomer content of at least 70 wt.-%, based on the total amount of the isomer mixture, and the amount of the amide is in the range of from 0.1 to 5 wt.-% based on the sum of the weight of the solid isocyanate as component (q1) and the amide as component (q2).

18. A method comprising utilizing the isocyanate composition (Q) according to claim 1 for the synthesis of polyurethane foams, compact polyurethane elastomers or thermoplastic polyurethanes.

19. The method to claim 18, wherein the polyurethane foams are foams for dampening applications, sealants, adhesives, coatings and for footwear applications.

20. A method comprising utilizing the isocyanate composition (Q) according to claim 1 for stabilizing a composition containing at least one polyurethane prepolymer.

21. The isocyanate composition (Q) according to claim 1, wherein the NCO-content is in the range of from 30 to 32 wt.-% based on the total weight of the isocyanate composition (Q).

* * * * *